Aug. 25, 1936.   C. T. DOMAN   2,052,017
AIR-COOLED INTERNAL COMBUSTION ENGINE
Filed June 12, 1933   3 Sheets-Sheet 3
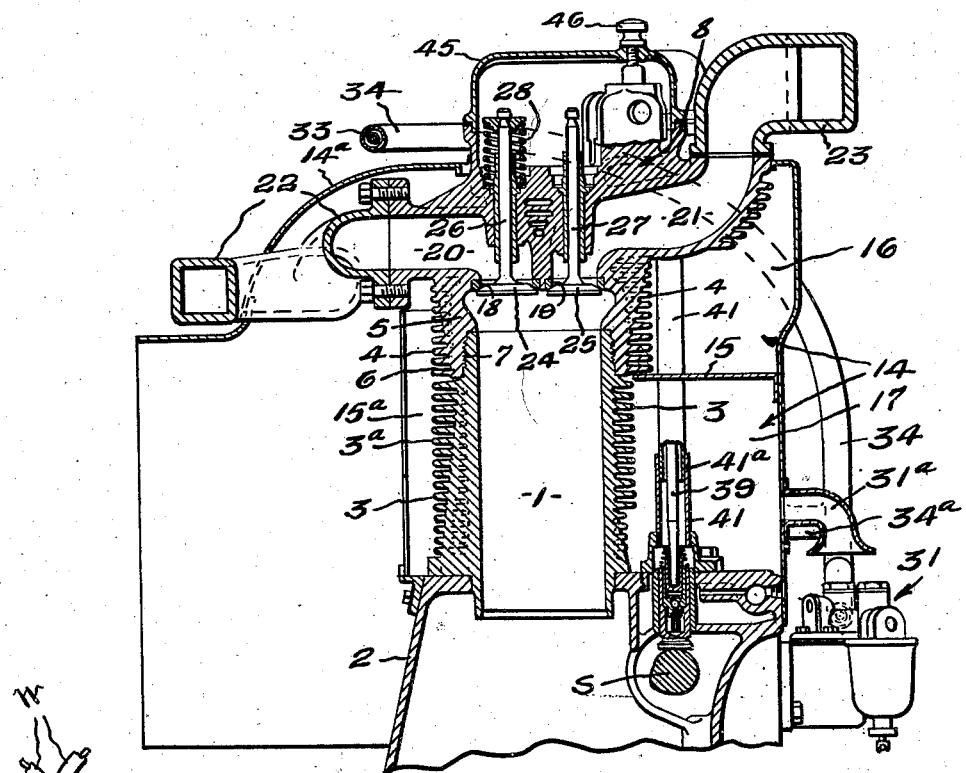
INVENTOR.
Carl T. Doman
BY Bodell & Thompson
ATTORNEYS.

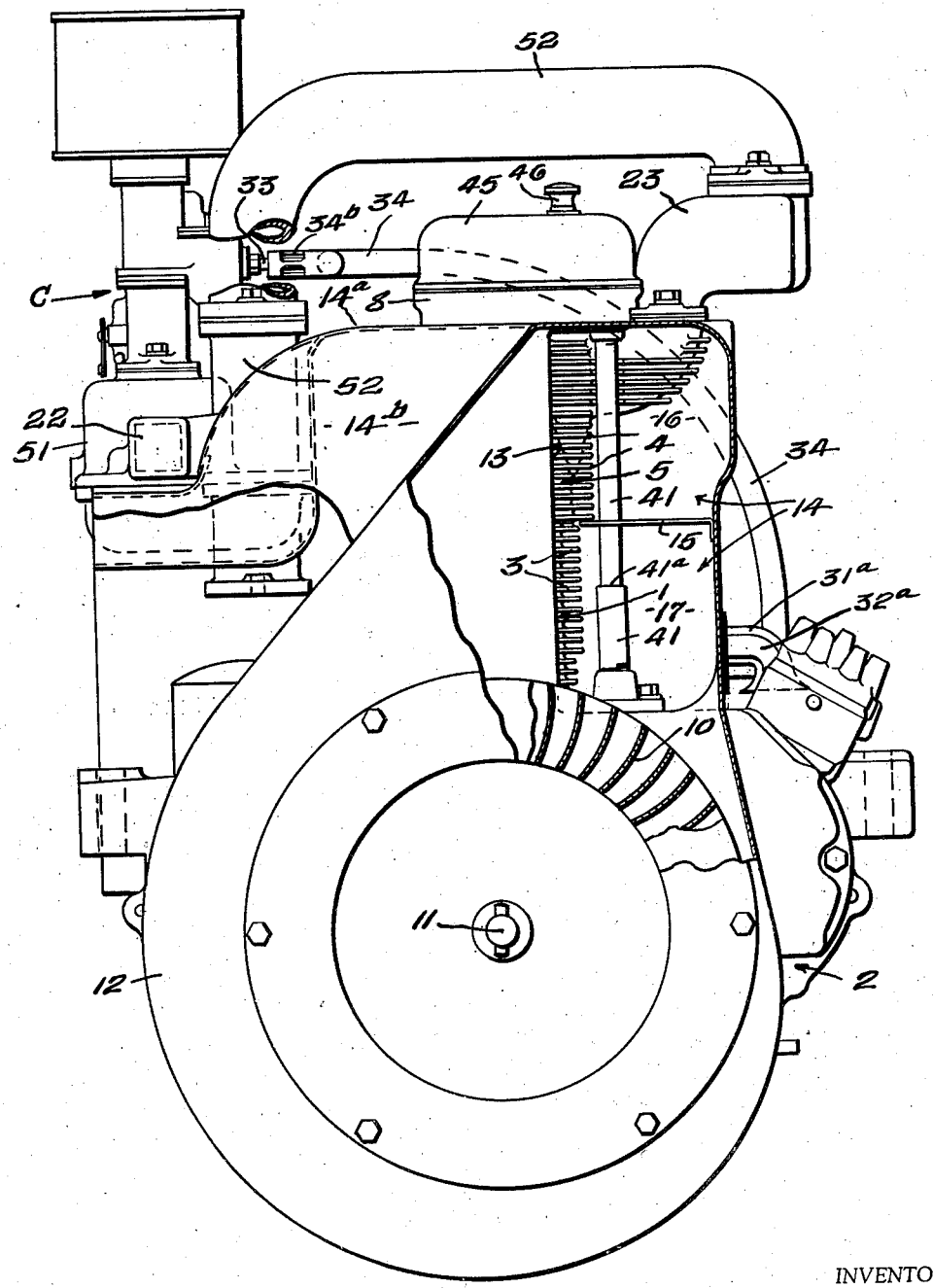

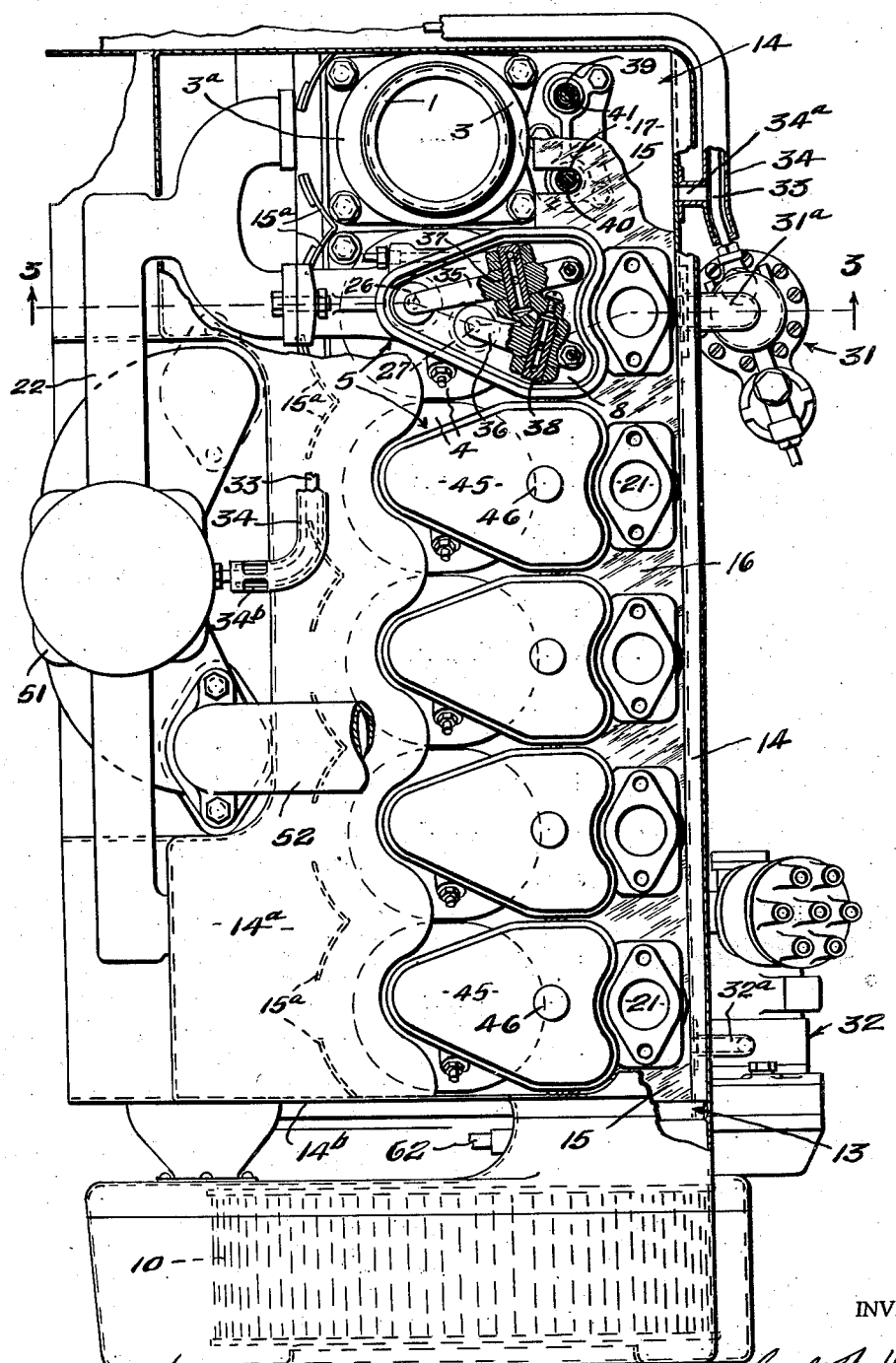

Patented Aug. 25, 1936

2,052,017

UNITED STATES PATENT OFFICE 2,052,017

AIR-COOLED INTERNAL COMBUSTION ENGINE

Carl T. Doman, Syracuse, N. Y., assignor to Doman & Marks, Syracuse, N. Y., a co-partnership composed of Carl T. Doman and Edward S. Marks Application June 12, 1933, Serial No. 675,360

5 Claims. (Cl. 123—171)

This invention relates to multi-cylinder, in-line, air cooled internal combustion engines, and has for its object, an air conduit through which air currents are passed, which conduit is arranged to discharge transversely of the line of cylinders, and has means for causing separate air currents to discharge against the heads and the barrels of the cylinders.

It further has for its object, a multi-cylinder engine provided with horizontal heat radiating flanges with the portion of the flanges on the lee side of the line of cylinders of greater width than those on the windward side, in order that the lee side of the cylinders may be cooled to the same extent as the windward side, and also means or deflectors for directing the air around the lee sides of the cylinders.

It further has for its object, an arrangement of the intake and exhaust valves in each cylinder head in such a manner that the valve on one side, usually the exhaust valve, is in line with the air current passing through the air conduit, it being borne in mind that the air current passes lengthwise of one side of the line of cylinders and transversely between the cylinders and the heads thereof, and that the resultant of the forces blowing the air lengthwise of the line of cylinders and causing the air current to turn between the cylinders, is a path at an oblique angle to the plane of the line of cylinders and the general direction of the air conduit.

It further has for its object, an air cooled cylinder construction in which the valves are arranged in the head, and the supports for the rocker arms of the valve mechanism are integral with the head provided with cooling flanges, so as to more adequately cool the head in the neighborhood of the valves and hence, cool the valve mechanism to a greater extent than in air cooled engines where the rocker arm supports are separate from the heads, and so mounted as to have an equalizing or warping action as the cylinders distort and elongate and contract under different temperatures.

It further has for its object, independent compensators for lift rods of the rocker arms of each cylinder, in which the rocker arm support is so formed integral with the cylinder head so that a zero clearance, or any predetermined clearance can be maintained between the rocker arms and the intake and exhaust valves of each cylinder, regardless of any differences that would otherwise result because of the intake and exhaust valve of each cylinder being subject to different temperature conditions.

It further has for its object, the positive cooling of instrumentalities usually associated with an internal combustion engine, and subject to the heat thereof, as for instance, a gasoline pump, oil pump, and oil filter, carburetor, generator, or any other instrument associated with an internal combustion engine.

It further has for its object means for cooling or keeping cool the fuel or gas line until it enters the carburetor.

The invention consists in the novel features and in the combinations and constructions hereinafter set forth and claimed.

In describing this invention, reference is had to the accompanying drawings in which like characters designate corresponding parts in all the views.

Figure 1 is an end elevation, partly in section, of an engine embodying my invention.

Figure 2 is a fragmentary, plan view, partly in section and parts being omitted.

Figure 3 is a transverse sectional view through one of the engine cylinders and contiguous parts on line 3—3, Figure 2.

Figure 4 is a fragmentary sectional view illustrating the connection between the rocker arm support and the tube between it and the crankshaft and the lift rod in said tube.

Figure 5 is a fragmentary view illustrating the means for cooling the distributor head and the wires leading therefrom to the spark plugs.

I designates the cylinders of the engine, these being mounted in line on the crank case 2, and being here shown as mounted independently of each other on the crank case so as to be removable and replaceable independently of each other. Each cylinder is formed with horizontal heat radiating flanges 3, 4, surrounding the barrel and the head thereof respectively, these being here shown cast integral with the cylinder. 5 designates the head of each cylinder. The head may be formed integral with the barrel of the cylinder, but in the illustrated embodiment of my invention, I have shown the head as formed with a skirt 6 which is internally threaded and which threads at 7 on the upper end of the barrel of the cylinder. The head may, if desired, be secured to the barrel in any well known manner so as to be detachable. Each head is also formed with a rocker arm support 8 integral therewith. By horizontal heat radiating flanges is meant flanges extending transversely or in a general horizontal direction. They may be inclined slightly.

In the illustrated embodiment of my invention, the cooling air current is created by a rotary fan 10 mounted on the crank shaft 11 of the engine at the front end thereof. The fan is located in a housing 12 having an outlet 13 discharging into a conduit 14 extending lengthwise of the line of cylinders on one side thereof, and being open at its side toward the cylinders in order to discharge air against the cylinders and the heads thereof. In order to create two distinct air currents and therefore distribute the air proportionately to the heads and barrels of the cylinders, the air conduit is provided with a lengthwise partition 15 dividing the conduit into upper and lower passages 16 and 17, the upper passage 16 discharging against the heads only, and the lower passage 17, against the barrels only of the cylinders. This arrangement insures that the heads, in which the heat is generated, are adequately and uniformly cooled. In order that the sides of the cylinders toward the air current and away from the air current, that is, the windward and lee sides of the cylinders may be equally cooled, the portions of the horizontal flanges on the lee side of the cylinders are of greater width than those on the windward side. These flanges are discoidal in general form but are offset or eccentric relatively to the axes of the cylinders, their centers being located out of the vertical plane containing the axes of the cylinders and toward the lee side of the cylinders so that the portions 3ª of the flanges on the lee side of the cylinders are wider than those on the windward side. Also, in order to distribute the air around the lee side of the cylinders, deflectors 15ª are located in line with the spaces between the cylinders on the lee side thereof.

A hood 14ª is provided on the lee side of the line of cylinders having a hooded top extending partly over the cylinders and end walls 14ᵇ at the end of the line of cylinders and joined to the air conduit 14. The housing 14ª confines and directs the air after it passes over the cylinders to a different course out through louvers in the hood of the vehicle or through an outlet under the floor board of the vehicle, or prevents the heated air from spreading under the hood of the vehicle.

The cylinder heads are formed with intake and exhaust ports 18 and 19 which communicate with two passages 20 and 21 formed in the head, with the intake and exhaust manifolds 22 and 23 respectively, and the rocker arm supports 8 are located above the passages 20 and 21 but are integral with the head structure.

24 and 25 are intake and exhaust valves for controlling the ports respectively, these having upwardly extending stems 26 and 27, which extend through the upper face of the rocker arm supports 8, the valves being held against their seats by suitable springs 28.

Heretofore, intake and exhaust ports have been located on opposite sides of the vertical plane common to the axes of all the cylinders and those of each cylinder located in a radial plane at a right angle to the former plane, or the valves have been located with their axes in the longitudinal vertical plane common to the axes of all the cylinders. In order to effect the most efficient cooling, I have arranged one of the valves, preferably, the exhaust valve on the windward side of the cylinders, but with its axis in a radial plane oblique to the vertical plane containing the axis of all the cylinders and inclining in a direction opposite to the flow of the cooling air current through the air conduit 14.

The path taken by the air in passing from the conduit to between the cylinders is the resultant of the forces tending to force it through the air conduit parallel to the common plane of the cylinders and of diverting it transversely between the cylinders and the exhaust valve passage is so located as to be in the direct line resultant of these forces.

31 and 32 illustrate two instrumentalities, as respectively, a fuel pump and an electric generator, used in connection with internal combustion engines and so associated therewith as to be subject to the heat of the engine. They are located out of the air current and preferably on the windward side of the line of cylinders. In order to cool them, the air conduit 14 is here shown as provided with outlets 31ª, 32ª, directed against these parts 31, 32 so that in the operation of the engine, these parts are cooled by cool air from the conduit 14. In order to keep the gasoline cool until it enters the carburetor C, the conduit 33 leading from the fuel pump to the carburetor is surrounded by an air jacket 34 having an inlet at 34ª in the conduit 14 and an air outlet 34ᵇ adjacent the carburetor.

The valve mechanism for operating the valves 24 and 25 includes rocker arms 35 and 36 suitably pivoted between their ends at 37 and 38 in bearings provided on the rocker arm support. Like ends of the rocker arms 35, 36 coact with the valve stems in the ordinary manner and their other ends coact with lift rods 39 and 40 which are actuated from a cam shaft S in the crank case 2 in the usual manner. The rocker arm supports are, however, not in any way, supported from the crank case. The lift rods 39, 40 are enclosed in tubes, as 41, connected at their upper and lower ends to the rocker arm supports and to the crank case and having at some point a slip joint as at 41ª, so that the rocker arm supports or the portions thereof, which overhang the crank case are in no way secured or tied to the crank case and hence, the rocker arm supports are subject only to the elongation of the cylinders and are not, in any way, affected or warped during the operation of the engine by a connection with the crank case.

Also, the wires W leading from the distributor head D to the spark plugs are cooled by circulating air among and around them by connecting the conduit in which they are enclosed in any convenient point into the air cooling system. As here shown, the conduit 60 which encloses the wires consists of two sections connected by a coupling 61 and this coupling has an inlet conduit 62 here shown as communicating with the outlet of the air housing 12. Hence, when the engine is running, air passes through the conduit 62, coupling 61, and in opposite directions through the sections of the conduit 60 cooling the wires, the air also blowing against the distributor head. By reason of this circulation of air, the wires are kept cool, and also the distributor head is cooled in a simple and efficient manner.

Heretofore, in air cooled engines, the overhead valves, and the rocker arms have been mounted on a support which is specially mounted on the heads of cylinders and also supported from or tied to the crank case to have a compensating warping action under the influence of the heat of the cylinders in order to keep the clearances between the rocker arms and the valve stems, as uniform as possible. In such engines, the rocker arm clearance must be at least .007 inch. In my engine, in order to compensate for variations that would otherwise occur because of the rocker arm support being integral with the head, means is provided in each lift rod to automatically take up any clearances that would otherwise occur so that a zero clearance can be maintained and no adjustments are necessary. The fact that zero clearances can be maintained results in less valve noise, and elimination of stress in accelerating mechanism parts, periodic noises in springs and breakage of valve springs from surge stresses. The compensating device forms no part of this invention but may be mechanical or hydraulic. That here shown is of the type in which the clearance is automatically taken up by oil from the crank case or oil from the rocker arm support, and insofar as this invention is concerned, the feature is a rocker arm support integral with the head of an air cooled internal combustion engine and not supported from or tied to the crank case or any other engine part colder than the cylinders, combined with automatic compensating devices in each lift rod for its equivalent. The rocker arm bearings are bored for a force feed oiling system, and the oil after lubricating the bearings drains into the crank case through the tube 41.

The valve mechanism or the rocker arms are covered by suitable caps 45, one for each cylinder or rocker arm support and the caps are held in position in any suitable manner, as by a nut 46, screwing on the bolt or stud extending upwardly through the cap from the rocker arm support. This construction of the cylinders with integral rocker arm supports permits the cylinder and head or the head if detachable, and the valve mechanism to be removed as a unit. It does not require demounting of the rocker arm supports as in other types of air cooled engines. In engines where the heads are integral with the barrels of cylinders, the entire cylinder can be readily removed with the valve mechanism attached. The carburetor C and intake manifold 22 are located on the lee side of the line of cylinders above or outside of the hooded portion 14ᵃ of the air conduit 14 and hence out of the path of the heated air passing from the cylinders. The intake manifold may be formed with a hot spot provided by a jacket 51 connected to the exhaust pipe 52 leading from the exhaust manifold.

Owing to the cylinder construction and the horizontal fins on the barrels and heads thereof, the integral construction of the rocker arm supports with the cylinder heads, the eccentricity of the head radiating flanges on the lee side of the cylinders, air conduit and housing, the distributing of the air through the air conduit in separate paths to the cylinder heads and to the barrels of the cylinders, the oblique arrangement of the valves and, the compensating means entirely individual to each rocker arm, the engine and particularly heavy-duty engines, cools most efficiently and operates efficiently without requiring numerous minute and skilled adjustments. Also, the features are applicable to various types of internal combustion engines, as explosion engines or engines of the Diesel type.

What I claim is:

1. In an air-cooled internal combustion engine, a line of cylinders having horizontal flanges around the barrels and the heads thereof, means for blowing separate air currents lengthwise of, and transversely of the barrels and the heads of the cylinders from one side of the line of cylinders to the other, said means including an air conduit extending lengthwise of one side of the line of cylinders and open at its side toward the cylinders, the conduit having a lengthwise partition separating it into upper and lower passages, the upper passage discharging transversely of the heads of the cylinders, and the lower, transversely of the barrels of the cylinders, and a fan, including a housing, having an outlet communicating with both passages.

2. In an air-cooled internal combustion engine, a line of cylinders being provided with horizontal flanges on the heads thereof, means for blowing air lengthwise of, and transversely of the cylinders from one side of the line of cylinders to the other side thereof, including a conduit extending lengthwise of the line of cylinders and arranged to discharge along one side against the cylinders, means for creating an air current through the conduit, intake and exhaust valves in the heads of the cylinders, one of the valves of each cylinder being arranged on the windward side thereof, and in a radial line oblique to a vertical plane containing the axes of the cylinders substantially coincident with the resultant direction of the air flow.

3. In an air-cooled internal combustion engine, a line of cylinders being provided with horizontal flanges on the heads thereof, means for blowing air from one side of the line of cylinders transversely of the cylinders to the other side thereof including a conduit extending lengthwise of the line of cylinders and arranged to discharge along one side against the cylinders, means for creating an air current through the conduit, intake and exhaust valves in the heads of the cylinders, the exhaust valve of each cylinder being arranged on the windward side thereof, and in a radial line oblique to a vertical plane containing the axes of the cylinders and substantially coincident to the resultant direction of the air flow.

4. In an air-cooled internal combustion engine, a line of cylinders having horizontal flanges on the barrels and heads thereof, means for blowing an air current transversely of the line of cylinders from one side to the other thereof including an air conduit extending lengthwise of one side of the cylinders and discharging against the same, and means for creating an air current through the conduit, the cylinders having intake and exhaust valves in the heads thereof, the valves of each cylinder being arranged on opposite sides of a vertical plane common to the axes of all of the cylinders and with their axes in a plane oblique to said vertical plane, and substantially coincident to the resultant direction of the air flow through the conduit and between the cylinders.

5. In an air cooled internal combustion engine having a cooling system including a fan, a fan housing and a conduit communicating with the fan housing, and having an outlet directed against the engine cylinders and an ignition system including a distributor head and wires leading therefrom to the spark plugs of the engine, a conduit enclosing said wires and a conduit connecting the former conduit into the air cooling system whereby air is blown through the conduit enclosing the wires.

CARL T. DOMAN.